(12) United States Patent
Xing et al.

(10) Patent No.: US 12,525,271 B2
(45) Date of Patent: Jan. 13, 2026

(54) MULTI-RESISTANCE-STATE SPINTRONIC DEVICE, READ-WRITE CIRCUIT, AND IN-MEMORY BOOLEAN LOGIC OPERATOR

(71) Applicant: INSTITUTE OF MICROELECTRONICS, CHINESE ACADEMY OF SCIENCES, Beijing (CN)

(72) Inventors: Guozhong Xing, Beijing (CN); Huai Lin, Beijing (CN); Feng Zhang, Beijing (CN); Di Wang, Beijing (CN); Long Liu, Beijing (CN); Changqing Xie, Beijing (CN); Ling Li, Beijing (CN); Ming Liu, Beijing (CN)

(73) Assignee: Institute of Microelectronics, Chinese Academy of Sciences, Beijing (CN)

( * ) Notice: Subject to any disclaimer, the term of this patent is extended or adjusted under 35 U.S.C. 154(b) by 426 days.

(21) Appl. No.: 18/259,747

(22) PCT Filed: Dec. 30, 2020

(86) PCT No.: PCT/CN2020/141520
§ 371 (c)(1),
(2) Date: Jun. 28, 2023

(87) PCT Pub. No.: WO2022/141226
PCT Pub. Date: Jul. 7, 2022

(65) Prior Publication Data
US 2024/0087628 A1 Mar. 14, 2024

(51) Int. Cl.
*G11C 11/16* (2006.01)
*H03K 19/21* (2006.01)
(Continued)

(52) U.S. Cl.
CPC ........ *G11C 11/161* (2013.01); *G11C 11/1673* (2013.01); *G11C 11/1675* (2013.01);
(Continued)

(58) Field of Classification Search
CPC .............. G11C 11/161; G11C 11/1673; G11C 11/1675; G11C 11/5607; G11C 11/18;
(Continued)

(56) References Cited

U.S. PATENT DOCUMENTS

2014/0062530 A1  3/2014 Miao et al.
2015/0325278 A1  11/2015 Bauer et al.
(Continued)

FOREIGN PATENT DOCUMENTS

CN  105280806 A  1/2016
CN  111740011 A  10/2020
(Continued)

*Primary Examiner* — Donald HB Braswell
(74) *Attorney, Agent, or Firm* — Christensen, Fonder, Dardi & Herbert PLLC; John P. Fonder (57) ABSTRACT

A multi-resistance-state spintronic device, including: a top electrode and a bottom electrode respectively connected to a read-write circuit; and a magnetic tunnel junction between two electrodes. The magnetic tunnel junction includes from top to bottom: a ferromagnetic reference layer, a barrier tunneling layer, a ferromagnetic free layer, and a spin-orbit coupling layer. Nucleation centers are provided at two ends of the ferromagnetic free layer to generate a magnetic domain wall; the spin-orbit coupling layer is connected to the bottom electrode, and when a write pulse is applied, an electron spin current is generated and drives the magnetic domain wall through a spin-orbit torque to move; a plurality of local magnetic domain wall pinning centers are provided at an interface between the spin-orbit coupling layer and the ferromagnetic free layer to enhance a strength of a DM interaction constant between interfaces.

10 Claims, 9 Drawing Sheets

(51) Int. Cl.
  *H10B 61/00* (2023.01)
  *H10N 50/10* (2023.01)
  *H10N 50/20* (2023.01)
  *H10N 50/80* (2023.01)
  *H10N 50/85* (2023.01)
  *H10N 52/85* (2023.01)

(52) U.S. Cl.
  CPC .............. *H03K 19/21* (2013.01); *H10B 61/00* (2023.02); *H10B 61/20* (2023.02); *H10N 50/10* (2023.02); *H10N 50/20* (2023.02); *H10N 50/80* (2023.02); *H10N 50/85* (2023.02); *H10N 52/85* (2023.02)

(58) Field of Classification Search
  CPC ........ H03K 19/21; H10B 61/00; H10B 61/20; H10B 61/22; H10N 50/10; H10N 50/20; H10N 50/80; H10N 50/85; H10N 52/85
  See application file for complete search history.

(56) References Cited

U.S. PATENT DOCUMENTS

| | | |
|---|---|---|
| 2019/0244646 A1 | 8/2019 | Lee et al. |
| 2019/0245136 A1* | 8/2019 | Choi ...................... H10N 50/01 |
| 2020/0303633 A1* | 9/2020 | Fitelson ................ G11C 11/161 |
| 2020/0326911 A1* | 10/2020 | Topaloglu ............... G06F 7/588 |

FOREIGN PATENT DOCUMENTS

| | | |
|---|---|---|
| CN | 111933789 A | 11/2020 |
| WO | WO 2011/115794 A2 | 9/2011 |

\* cited by examiner

MULTI-RESISTANCE-STATE SPINTRONIC DEVICE, READ-WRITE CIRCUIT, AND IN-MEMORY BOOLEAN LOGIC OPERATOR

CROSS-REFERENCE TO RELATED APPLICATION

This application is a Section 371 National Stage Application of International Application No. PCT/CN2020/141520, filed on Dec. 30, 2020, entitled "MULTI-RESISTANCE-STATE SPINTRONIC DEVICE, READ-WRITE CIRCUIT, AND IN-MEMORY BOOLEAN LOGIC OPERATOR", the content of which is hereby incorporated by reference in its entirety.

TECHNICAL FIELD

The present disclosure relates to a field of an information memory technology, and in particular, to a multi-resistance-state spintronic device, a read-write circuit, and an in-memory Boolean logic operator.

BACKGROUND

In order to complete data-centric real-time tasks, such as an intensive edge computing of an automatic drive, an Internet of Things and neural network computing, etc., a development of an in-memory computing (IMC) high-performance device is becoming a research upsurge in academia and industry. A key concept of the IMC is to embed a logical cell in a memory to make better use of external and internal memory bandwidths, which may significantly improve an efficiency of data communication energy and delay, and provide an internal parallelism for data processing in the memory. Recently, an IMC architecture based on a dynamic random access memory (DRAM) and a static random access memory (SRAM) has been reported. However, they also inevitably face some serious problems, for example, a high leakage power, initial data being overwritten, etc., which may hinder a further research thereof.

A new-type spintronic information device, such as SOT-MRAM (Magnetoresistive Random Access Memory) based on Spin-orbit Torque (SOT) drive data writing, has a more competitive operating speed and energy efficiency performance, and especially has an independent read-write path, making the SOT-MRAM superior in durability. In terms of implementing an in-memory computing function, a logical operation of a spintronic device mainly relies on a collocation with a transistor to form a hybrid operation circuit. A "logic tree" is formed using the transistor so as to achieve a basic Boolean logical operation; alternatively, with an assistance of an external read-write circuit, a logical operation and a memory may be completed in a memory cell itself, so as to avoid a "memory wall bottleneck" existing in a traditional von Neumann structure.

In current researches, use of the transistor to achieve the logical operation generally faces problems such as a large number of devices, a high area overhead, a static power consumption, etc. In a way of completing the logical operation and a result memory by using a non-volatile memory, a simple Boolean logical operation (such as AND, OR) may be easily completed in one step. However, when an operation that is designed slightly more complex requires a plurality of logical combinations (such as a full addition operation), a plurality of memory cells are required to achieve a simple logic step by step. Furthermore, read and write back operations are performed from time to time during the process, so that an operating time may not only be prolonged, but also an energy consumption required for the circuit may be increased, which may be not conducive to exerting advantages of an in-memory computing technology. The problem is common in the spintronic device and even other non-volatile memory devices. Therefore, it is urgent to develop a multifunctional new-type SOT-MTJ (Spin-orbit Torque Magnetic Tunneling Junction) device in both an SOT-MRAM cell array and a peripheral circuit to solve the above-mentioned problems, so as to achieve a high speed and a low power consumption and reduce a design complexity.

SUMMARY

In order to solve the above-mentioned technical problems, improve a speed of a logical operation, reduce a power consumption of the logical operation, and reduce a complexity of the logical operation, the present disclosure provides a multi-resistance-state spintronic device, a read-write circuit, and an in-memory Boolean logic operator. The specific solution is as follows.

A multi-resistance-state spintronic device is provided, including:
 a top electrode configured to be connected to an external read circuit to read a signal;
 a bottom electrode configured to be connected to an external write circuit to receive a write signal; and
 a magnetic tunnel junction, including:
 a ferromagnetic reference layer below the top electrode;
 a ferromagnetic free layer below the ferromagnetic reference layer, wherein a magnetization direction of the ferromagnetic free layer is antiparallel to a magnetization direction in the ferromagnetic reference layer, and magnetic domain wall nucleation centers are provided at two ends of the ferromagnetic free layer and configured to generate a magnetic domain wall;
 a barrier tunneling layer between the ferromagnetic reference layer and the ferromagnetic free layer, wherein the barrier tunneling layer is configured to isolate the ferromagnetic reference layer and the ferromagnetic free layer; and
 a spin-orbit coupling layer below the ferromagnetic free layer, wherein two ends of the spin-orbit coupling layer are respectively connected to two bottom electrodes, the spin-orbit coupling layer is configured to generate a spin polarized current under an action of the write signal to drive the magnetic domain wall to move, a plurality of local magnetic domain wall pinning centers are provided at intervals on the spin-orbit coupling layer to enhance a Dzyaloshinskii-Moriya interaction between interfaces, so as to form a plurality of resistance state regions.

According to some embodiments of the present disclosure, materials of the ferromagnetic reference layer and the ferromagnetic free layer include one of: CoFeB, CoFeAl, or Co.

According to some embodiments of the present disclosure, a material of the spin-orbit coupling layer includes one or a combination of: W, Ta, an alloy containing W, or an alloy containing Ta.

According to some embodiments of the present disclosure, materials of the local magnetic domain wall pinning centers and the magnetic domain wall nucleation centers include Pt.

According to some embodiments of the present disclosure, anisotropy energies at two ends of the ferromagnetic free layer are adjustable, and an effective spin-orbit like field torque and a DM interaction intensity at an interface between the ferromagnetic free layer and the spin-orbit coupling layer are adjustable.

According to some embodiments of the present disclosure, a number of the local magnetic domain wall pinning centers is N, N pinning regions are generated in the ferromagnetic free layer, and the multi-resistance-state spintronic device includes N resistance states, where N≥3 and N is an integer.

The present disclosure further provides a read-write circuit, including:

the multi-resistance-state spintronic device as described above;

a write circuit connected to a bottom electrode of the multi-resistance-state spintronic device, wherein the write circuit is configured to transmit a pulse current to the multi-resistance-state spintronic device to complete a data writing; and a read circuit connected to a top electrode of the multi-resistance-state spintronic device, wherein the read circuit is configured to receive a reference voltage generated by the multi-resistance-state spintronic device to complete data reading.

According to some embodiments of the present disclosure, the bottom electrode of the multi-resistance-state spintronic device includes a first bottom electrode and a second bottom electrode, the first bottom electrode is connected to a drain electrode of a first transistor, and the top electrode is connected to a drain electrode of a second transistor;

the write circuit is connected to the bottom electrode of the multi-resistance-state spintronic device, a write signal $V_{in}$ of the write circuit is a gate control signal of the first transistor to control on/off of the first transistor, and the write circuit is configured to transmit the pulse current to the multi-resistance-state spintronic device to complete the data writing; and the read circuit is connected to the top electrode, a read signal $V_{read}$ of the read circuit is a gate control signal of the second transistor to control on/off of the second transistor, an induced current pulse passes through the multi-resistance-state spintronic device to generate the reference voltage, and the data reading is completed according to the reference voltage.

According to some embodiments of the present disclosure, the multi-resistance-state spintronic device includes a first resistance state, a second resistance state, a third resistance state, and a fourth resistance state;

the write circuit is addressed through a row decoding and a column decoding, the first transistor is turned on through a write word line, a write pulse is injected to drive a magnetic domain wall to move, a switching between different resistance states is controlled by controlling a number and a direction of the write pulse, and a displacement direction of the magnetic domain wall is controlled by controlling a polarity direction of the write pulse; and the read circuit is addressed through a row decoding and a column decoding, the second transistor is turned on through a read word line to generate the reference voltage, and a resistance state information of the multi-resistance-state spintronic device is read through a sense amplifier.

The present disclosure further provides an in-memory Boolean logic operator, including:

the read-write circuit as described above;

wherein a write circuit is configured to receive pulses output by a memory array and drive a magnetic domain wall to move, so as to change a resistance state of a multi-resistance-state spintronic device;

a read circuit is configured to read a resistance state information of the multi-resistance-state spintronic device; and the in-memory Boolean logic operator is configured to implement a Boolean logical operation and a result reading through a writing and a reading of the write-read circuit.

In the present disclosure, the ferromagnetic free layer may exhibit different resistance states under an electric field control by providing the plurality of local magnetic domain wall pinning centers on the ferromagnetic free layer of the magnetic tunnel junction and providing the magnetic domain wall nucleation centers at the two ends of the ferromagnetic free layer. The bottom electrode and the top electrode are connected to an external read-write circuit, and the read-write circuit controls a change in the resistance state and a reading of the resistance state information of the multi-resistance-state spintronic device, so that a writing and a reading of an information may be completed. Compared to the prior art, the technical solution provided by the present disclosure may greatly improve a reading and operation speed, reduce a complexity of the Boolean logical operation in the device, and reduce a power consumption of reading and operation.

101 represents a top electrode; 102 represents a ferromagnetic reference layer; 103 represents a barrier tunneling layer; 104 represents a ferromagnetic free layer; 105 represents a spin-orbit coupling layer; 106 represents a bottom electrode; 107 represents a magnetic domain wall nucleation center; 108 represents a local magnetic domain wall pinning center; 201 represents a first nucleation region; 202 represents a first pinning region, 203 represents a second pinning region, 204 represents a third pinning region, 205 represents a fourth pinning region; 206 represents a second nucleation region; 2a represents a first resistance state; 2b represents a second resistance state; 2c represents a third resistance state; 2d represents a fourth resistance state; 401 represents a write circuit; 402 represents a multi-resistance-state spintronic device; 403 represents a read circuit; 601 represents a binary MRAM memory array; 602 represents a memory array sense amplifier; 603 represents a logical operation array; 604 represents a logical operation result output portion.

DETAILED DESCRIPTION OF EMBODIMENTS

In order to make objectives, technical solutions and advantages of the present disclosure clearer, the present disclosure will be further described in detail below with reference to specific embodiments and accompanying drawings.

However, it should be understood that the descriptions are only exemplary and are not intended to limit the scope of the present disclosure. In the following detailed descriptions, for ease of description, many specific details have been elaborated to provide a comprehensive understanding of the embodiments of the present disclosure. However, it is obvious that one or more embodiments may also be implemented without the specific details. In addition, in the following descriptions, descriptions of well-known technologies are omitted to avoid unnecessarily obscuring the concept of the present disclosure.

Terms used herein are only intended to describe specific embodiments and are not intended to limit the present disclosure. Terms "include", "comprise", "contain", etc. used herein indicate the presence of the described features, steps, operations and/or components, but do not exclude the presence or addition of one or more other features.

All terms (including technical and scientific terms) used herein have meanings generally understood by those skilled in the art, unless otherwise defined. It should be noted that the terms used herein should be interpreted as having the meaning consistent with the context of the present disclosure, and should not be interpreted in an idealized or overly rigid manner. For example, for a DM constant between interfaces, a coefficient of a direct DM interaction between two materials may affect an energy of a magnetic domain wall; for DMI (Dzyaloshinskii-Moriya Interaction), $\alpha\text{-Fe}_2\text{O}_3$ is theoretically predicted to belong to an antiferromagnetic spin configuration, but $\alpha\text{-Fe}_2\text{O}_3$ was found to have a weak ferromagnetism in experiments. Dzyaloshinskii provided a phenomenological model in 1958 to explain such a phenomenon. In 1960, a spin-orbit coupling is introduced into an Anderson superexchange interaction theory to explain the phenomenological model of Dzyaloshinskii, which was named Dzyaloshinskii-Moriye interaction.

In order to solve the above-mentioned technical problems, improve a speed of a logical operation, reduce a power consumption of the logical operation and reduce a complexity of the logical operation, the present disclosure provides a multi-resistance-state spintronic device, a read-write circuit, and an in-memory Boolean logic operator. The specific solution is as follows.

Figure 1:
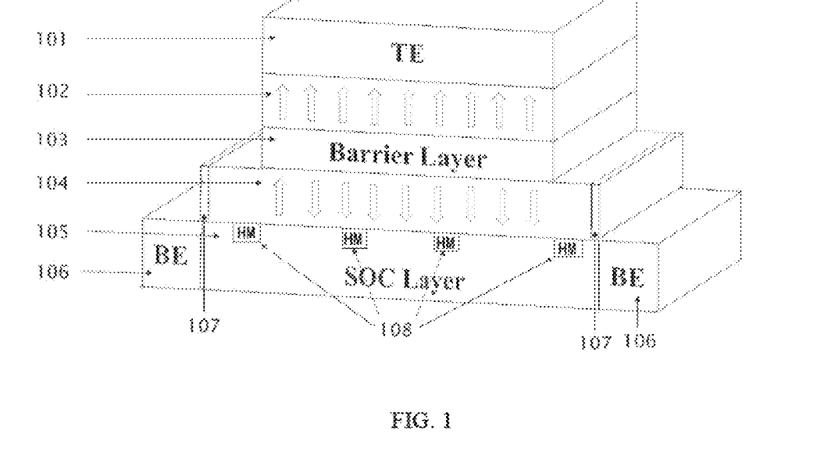
FIG. 1 schematically shows a schematic structural diagram of a multi-resistance-state spintronic device according to embodiments of the present disclosure.
Figure 4:
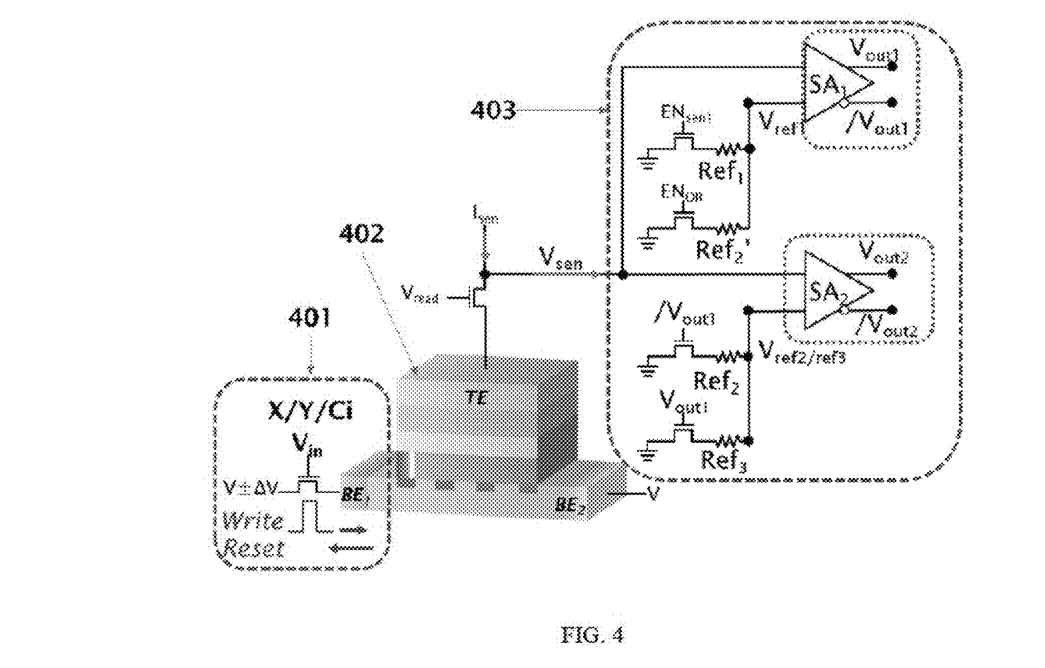
FIG. 4 schematically shows a schematic diagram of a read-write circuit according to embodiments of the present disclosure.

FIG. 1 schematically shows a schematic structural diagram of a multi-resistance-state spintronic device according to embodiments of the present disclosure, and FIG. 4 schematically shows a schematic diagram of a read-write circuit according to embodiments of the present disclosure.

According to some embodiments of the present disclosure, a multi-resistance-state spintronic device 402, as shown in FIG. 1 and FIG. 4, includes a top electrode 101, a bottom electrode 106, and a magnetic tunnel junction.

According to some embodiments of the present disclosure, the top electrode 101 is used to be connected to an external read circuit 403 to read a signal.

According to some embodiments of the present disclosure, the bottom electrode 106 is used to be connected to an external write circuit 401 to receive a write signal.

According to some embodiments of the present disclosure, the magnetic tunnel junction includes a ferromagnetic reference layer 102, a ferromagnetic free layer 104, a barrier tunneling layer 103, and a spin-orbit coupling layer 105.

According to some embodiments of the present disclosure, the ferromagnetic reference layer 102 is below the top electrode 101.

According to some embodiments of the present disclosure, the ferromagnetic free layer 104 is below the ferromagnetic reference layer 102, and a magnetization direction of the ferromagnetic free layer 104 is antiparallel to a magnetization direction in the ferromagnetic reference layer 102, that is, the directions are opposite and parallel to each other. Magnetic domain wall nucleation centers 107 are provided at two ends of the ferromagnetic free layer 104 and used to generate a magnetic domain wall.

According to some embodiments of the present disclosure, the barrier tunneling layer 103 is between the ferromagnetic reference layer 102 and the ferromagnetic free layer 104 and used to isolate the ferromagnetic reference layer 102 and the ferromagnetic free layer 104.

According to some embodiments of the present disclosure, the spin-orbit coupling layer 105 is below the ferromagnetic free layer 104, two ends of the spin-orbit coupling layer 105 are connected to two bottom electrodes 106 respectively, the spin-orbit coupling layer 105 is used to generate a spin current under an action of the write signal to drive the magnetic domain wall to move, a plurality of local magnetic domain wall pinning centers 108 are spaced from each other on the spin-orbit coupling layer 105 to enhance a DM interaction constant between interfaces, so as to form a plurality of resistance state regions.

According to some embodiments of the present disclosure, materials of the ferromagnetic reference layer 102 and the ferromagnetic free layer 104 include one of: CoFeB, $Co_2FeAl$, or Co.

According to some embodiments of the present disclosure, a material of the spin-orbit coupling layer 105 includes one or a combination of: W, Ta, an alloy containing W, or an alloy containing Ta.

According to some embodiments of the present disclosure, materials of the local magnetic domain wall pinning center 108 and the magnetic domain wall nucleation center 107 include Pt.

According to some embodiments of the present disclosure, anisotropy energies at two ends of the ferromagnetic free layer 104 are adjustable, and an effective spin-orbit like field torque and a DM interaction intensity at an interface between the ferromagnetic free layer 104 and the spin-orbit coupling layer 105 are adjustable.

According to some embodiments of the present disclosure, the number of the local magnetic domain wall pinning centers is N, N pinning regions are generated in the ferromagnetic free layer, and the multi-resistance-state spintronic device includes N resistance states, where N≥3 and N is an integer.

According to some embodiments of the present disclosure, the number of N is 4, and the multi-resistance-state spintronic device 402 includes 4 resistance states.

Figure 2:
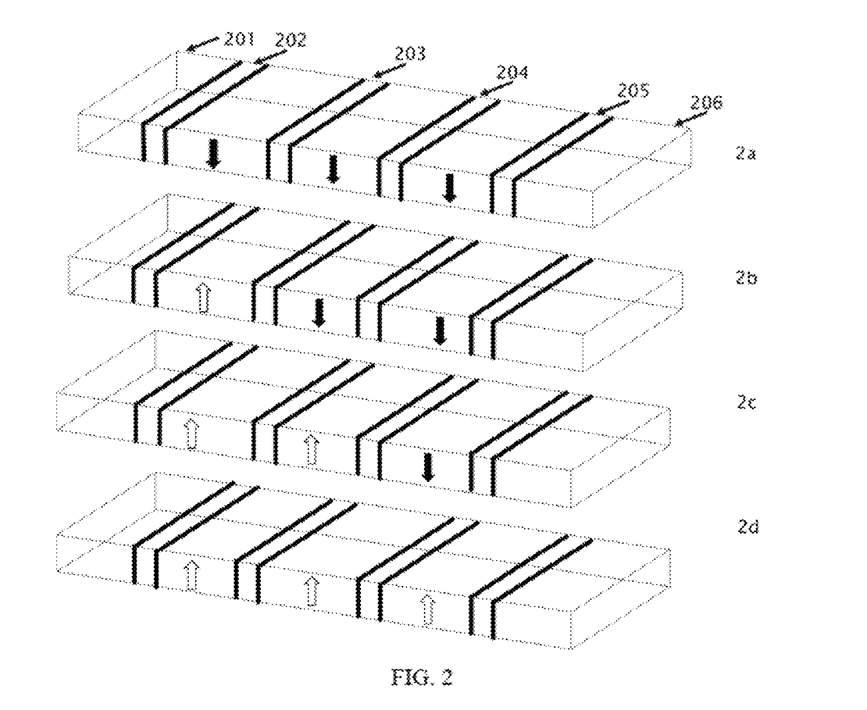
FIG. 2 schematically shows a schematic diagram of a distribution of magnetic domain walls in a ferromagnetic free layer under different resistance states of a multi-resistance-state spintronic device according to embodiments of the present disclosure.

FIG. 2 schematically shows a schematic diagram of a distribution of magnetic domain walls in a ferromagnetic free layer under different resistance states of a multi-resistance-state spintronic device according to embodiments of the present disclosure.

According to some embodiments of the present disclosure, as shown in FIG. 2, the multi-resistance-state spintronic device 402 includes a first resistance state 2a, a second resistance state 2b, a third resistance state 2c, and a fourth resistance state 2d.

According to some embodiments of the present disclosure, the two ends of the ferromagnetic free layer 104 are a first nucleation region 201 and a second nucleation region 206, respectively.

According to some embodiments of the present disclosure, 202, 203, 204 and 205 are contact portions between the ferromagnetic free layer 104 and the local magnetic domain wall pinning centers 108.

According to some embodiments of the present disclosure, taking an initial magnetization direction downwards as an example, an initial state of a magnetic domain corresponds to the first resistance state 2a. After a nucleation of a nucleation current, the magnetic domain wall moves to a first pinning region 202 located at a left boundary of the ferromagnetic free layer 104; during a resistance state switching of the multi-resistance-state spintronic device 402, a current pulse is input from a first bottom electrode ($BE_1$ in FIG. 4) to drive the magnetic domain wall into a second pinning region 203, which corresponds to the second resistance state 2b; the pulse is input again, and the magnetic domain wall enters a third pinning region 204, which corresponds to the third resistance state 2c; the last pulse is input, the magnetic domain wall enters a fourth nucleation region 205 at the rightmost end of the ferromagnetic free layer 104, which corresponds to the fourth resistance state 2d.

According to some embodiments of the present disclosure, when the current pulse is reversely applied, the current pulse is input from a second bottom electrode, a moving direction of the magnetic domain wall is opposite to the above direction.

Figure 3A:
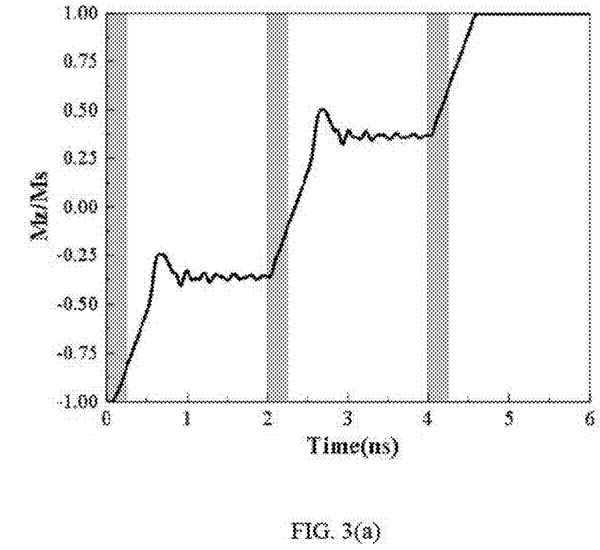
FIG. 3(a) schematically shows a schematic diagram of a resistance state switching of a multi-resistance-state spintronic device by a current pulse according to embodiments of the present disclosure.
Figure 3B:
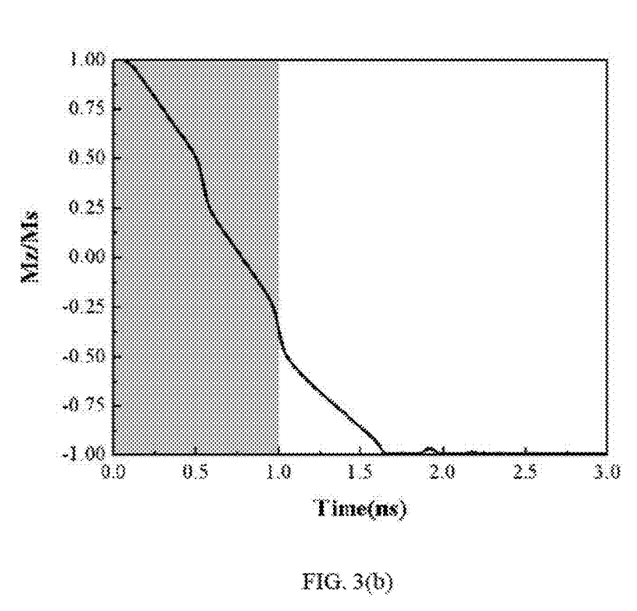
FIG. 3(b) schematically shows a schematic diagram of a resistance state reset of a multi-resistance-state spintronic device according to embodiments of the present disclosure.
Figure 3C:
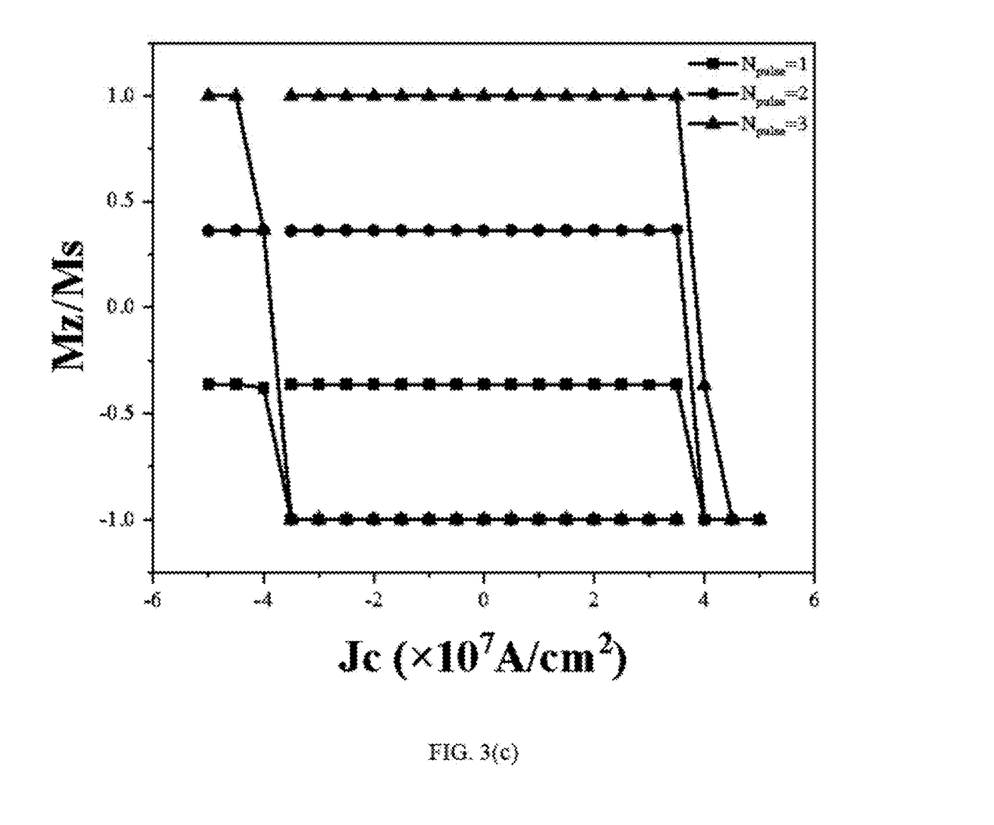
FIG. 3(c) schematically shows a schematic diagram of an effect of pulse currents of different amplitudes on a resistance state switching of a multi-resistance-state spintronic device according to embodiments of the present disclosure.

FIG. 3(a) schematically shows a schematic diagram of a resistance state switching of a multi-resistance-state spintronic device by a current pulse according to embodiments of the present disclosure; FIG. 3(b) schematically shows a schematic diagram of a resistance state reset of a multi-resistance-state spintronic device according to embodiments of the present disclosure; FIG. 3(c) schematically shows a schematic diagram of an effect of pulse currents of different amplitudes on a resistance state switching of a multi-resistance-state spintronic device according to embodiments of the present disclosure.

According to some embodiments of the present disclosure, as shown in FIG. 3(a), the ferromagnetic free layer 104 has a size of 320 nm×70 nm×0.8 nm, and uses a CoFeB material as a simulation material. FIG. 3(a) shows an effect of the current pulse on the resistance state switching of the multi-resistance-state spintronic device 402. After injecting the current pulses sequentially, a magnetization of the ferromagnetic free layer 104 changes, so that different resistance states are generated. Driven by a single current pulse with a pulse width of $4.5×10^7$ A/cm$^2$, 0.25 ns, as shown in a gray region in FIG. 3(a), a magnetization $M_z/M_s$ in the ferromagnetic free layer 104 is driven from close to −1 (in which a magnetization direction is antiparallel to the magnetization direction in the ferromagnetic reference layer 102) at an initial timing to close to −0.3. At this time, the magnetic domain wall moves from the first pinning region 202 to the second pinning region 203, and oscillates near the region and then gradually stabilizes, so as to switch a resistance state of the multi-resistance-state spintronic device 402 from the first resistance state 2a to the second resistance state 2b. At 2 ns, a second pulse is applied, and $M_z/M_s$ is further switched to about 0.3. At this time, the magnetic domain wall is located in the third pinning region 204, and the third resistance state 2c is formed for the multi-resistance-state spintronic device 402; at 4 ns, when a third pulse is applied, $M_z/M_s$ is close to 1 (in which the magnetization direction is antiparallel to the magnetization direction in the ferromagnetic reference layer), and the magnetic domain wall enters a fourth pinning region 205. At this time, the multi-resistance-state spintronic device 402 is the fourth resistance state 2d. Thus, the pulse may control the resistance state switching sequentially.

According to some embodiments of the present disclosure, in an application process, in addition to the above-mentioned unidirectional switching between adjacent resistance states, sometimes a reverse reset operation is also required. The solution may be to sequentially apply a current pulse that is opposite to the above-mentioned situation, or to apply a current pulse with a wider pulse width, so as to switch the resistance state of the multi-resistance-state spintronic device 402 from the fourth resistance state 2d to the first resistance state 2a. As shown in FIG. 3b), when the multi-resistance-state spintronic device 402 is in the fourth resistance state 2d, a single current pulse that has a current direction opposite to an original current direction and has an amplitude of $10^7$ A/cm$^2$ and a pulse width of 1 ns is applied. After a relaxation time of about 0.6 ns, a magnetization state returns to the initial state, and the resistance state is then reset to the first resistance state 2a.

According to some embodiments of the present disclosure, as shown in FIG. 3(c), an effect of different pulse current amplitudes on the resistance state switching of the multi-resistance-state spintronic device 402 is demonstrated.

For parameters set during a simulation of the multi-resistance-state spintronic device 402, a single pulse with a current density greater than $4 \times 10^7$ A/cm$^2$ and a single pulse width of 0.25 ns may achieve a switching between the first resistance state 2a and the second resistance state 2b, two pulses may achieve a switching between the first resistance state 2a and the third resistance state 2c, and three pulses may achieve a switching between the first resistance state 2a and the fourth resistance state 2d.

According to some embodiments of the present disclosure, the multi-resistance-state spintronic device 402 may be used as a memory to achieve a multi-valued memory function, or as a polymorphic logic gating device to achieve a Boolean logical operation and a full addition operation.

FIG. 4 schematically shows a schematic diagram of a read-write circuit according to embodiments of the present disclosure.

According to some embodiments of the present disclosure, as shown in FIG. 4, the present disclosure further provides a read-write circuit, including: the above-mentioned multi-resistance-state spintronic device 402, the write circuit 401, and the read circuit 403.

According to some embodiments of the present disclosure, the above-mentioned read-write circuit is further expanded into an array structure.

According to some embodiments of the present disclosure, the read circuit 403 is a composite sensitive amplification read circuit.

According to some embodiments of the present disclosure, the write circuit 401 is connected to the bottom electrode 106 of the multi-resistance-state spintronic device 402, and used to transmit a pulse current to the multi-resistance-state spintronic device 402 to complete data writing.

According to some embodiments of the present disclosure, the read circuit 403 is connected to the top electrode 101 of the multi-resistance-state spintronic device 402, and used to receive a reference voltage generated by the multi-resistance-state spintronic device 402 to complete data reading.

According to some embodiments of the present disclosure, the bottom electrode 106 of the multi-resistance-state spintronic device 402 includes a first bottom electrode and a second bottom electrode, the first bottom electrode is connected to a drain electrode of a first transistor, and the top electrode is connected to a drain electrode of a second transistor.

According to some embodiments of the present disclosure, the write circuit 401 is connected to the first bottom electrode, a write signal yin of the write circuit 401 is a gate control signal of the first transistor to control on/off of the first transistor, and the write circuit 401 is used to inject the current pulse into the multi-resistance-state spintronic device 402 to complete the data writing.

According to some embodiments of the present disclosure, the read circuit 403 is connected to the top electrode, a read signal $V_{read}$ of the read circuit 403 is a gate control signal of the second transistor to control on/off of the second transistor, an induced current passes through the multi-resistance-state spintronic device 402 to generate the reference voltage, and the data reading is completed according to the reference voltage.

According to some embodiments of the present disclosure, the write circuit 401 is addressed through row and column decoding, the first transistor is turned on through a write word line, a write pulse is injected to drive a magnetic domain wall to move, a switching between different resistance states is controlled by controlling a number and a direction of the write pulse, and a displacement direction of the magnetic domain wall is controlled by controlling a polarity direction of the write pulse.

According to some embodiments of the present disclosure, the read circuit 403 is addressed through the row and column decoding, the second transistor is turned on through a read word line to generate the reference voltage, and a resistance state information of the multi-resistance-state spintronic device is read through a sense amplifier.

According to some embodiments of the present disclosure, in the initial state, a memory state of the multi-resistance-state spintronic device 402 is the first resistance state 2a, corresponding data "AB"="00", and the write signal $V_{in}$ in 401 is used as the gate control signal of the first transistor connected to the first bottom electrode 1 (BE$_1$) to control on/off of the transistor. When writing data, $V_{in}$ is placed at an applied voltage to control on of the first transistor. A single pulse current is injected into the spin-orbit coupling layer 105 to drive the magnetic domain wall in the ferromagnetic free layer 104 to move to the second pinning region, and data is written as "01"; a corresponding second pulse current and a corresponding third pulse current write "10" and "11", respectively. In a reset operation, a reset pulse with the same amplitude and a pulse width of 1 ns is applied in an opposite direction, which may reset the resistance state of the multi-resistance-state spintronic device 402 to the first resistance state 2a. The above-mentioned dimensions and current parameters of the multi-resistance-state spintronic device 402 vary depending on a structure and a material of the device, which will not be limited in the present disclosure.

According to some embodiments of the present disclosure, during a reading process, the signal yin is placed at 0 V, and the read signal $V_{read}$ is placed at an applied voltage. A corresponding second transistor is turned on, the induced current passes through the magnetic tunnel junction of the multi-resistance-state spintronic device 402, and a reference voltage $V_{sen}$ generated and input to the read circuit 403. The read circuit 403 includes two sense amplifiers SA$_1$ and SA$_2$. An enable signal (EN$_{sen2}$) of SA$_2$ is slightly delayed by an enable signal (EN$_{sen1}$) of SA$_1$. Specifically, the delay is in a range of 1 ns to 10 ns. At this time, the enable signal (EN$_{sen1}$) arrives, and a reference current flows through the reference resistor REF$_1$ to generate a reference voltage $V_{ref1}$, which is used to determine whether a memory cell is in the first resistance state 2a, the second resistance state 2b, the third resistance state 2c, or the fourth resistance state 2d. $V_{sen}$ and $V_{ref1}$ input SA$_1$ together. If a read memory cell is in the first resistance state 2a or the second resistance state 2b, an output $V_{out1}$ of SA$_1$ is "0"; if the read memory cell is in the third resistance state 2c or the fourth resistance state 2d, the output $V_{out1}$ of SA$_1$ is "1". $V_{out1}$ and an output of a complementary signal $\overline{Vout1}$ end thereof are used as gate control signals to respectively control transistors connected in series to REF$_3$ and REF$_2$ so as to generate the reference voltage. Specifically, when the memory cell is in one of the first resistance state 2a or the second resistance state 2b, $V_{out1}$ is output as "0". At this time, $\overline{Vout1}$=1. REF$_2$ is controlled to generate the reference voltage to distinguish between the first resistance state 2a and the second resistance state 2b. When the memory cell is in the first resistance state 2a, $V_{out2}$=0, the output of $V_{out1}$ is synthesized, and read memory data is "00"; when the memory cell is in the second resistance state 2b, $V_{out2}$=1, the output of $V_{out1}$ is synthesized, and the read memory data is "01"; when the memory cell is in one of the third resistance state 2c or the fourth resistance state 2d, $V_{out1}$ is output as "1", $REF_3$ is controlled to generate the reference voltage to distinguish between the third resistance state 2c and the fourth resistance state 2d; when the memory cell is in the third resistance state 2c, $V_{out2}$=0, the output of $V_{out1}$ is synthesized, and the read memory data is "10"; when the memory cell is in the fourth resistance state, $V_{out2}$=1, the output of $V_{out1}$ is synthesized, and the read memory data is "11". The above-mentioned technical solution may achieve a reading of four resistance state information of the multi-resistance-state spintronic device 402.

Figure 5A:
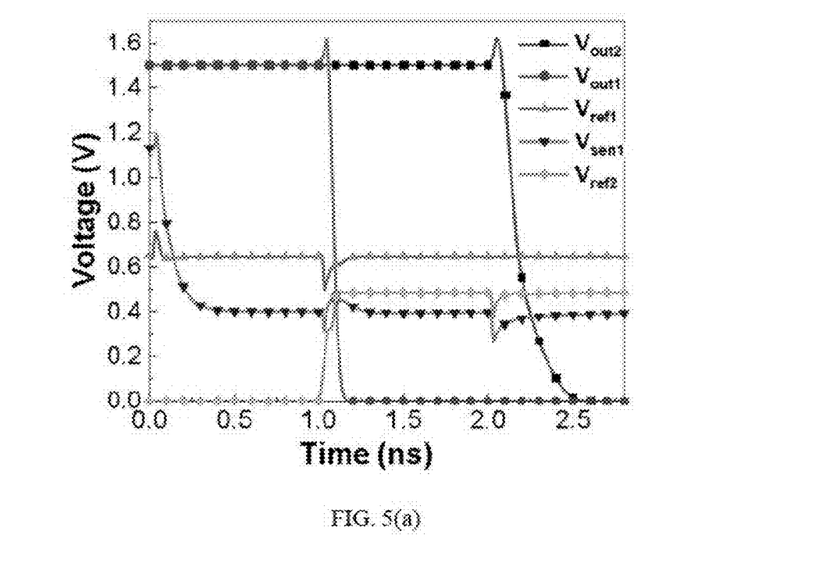
FIG. 5(a) schematically shows a read result of a first resistance state of a multi-resistance-state spintronic device according to embodiments of the present disclosure.
Figure 5B:
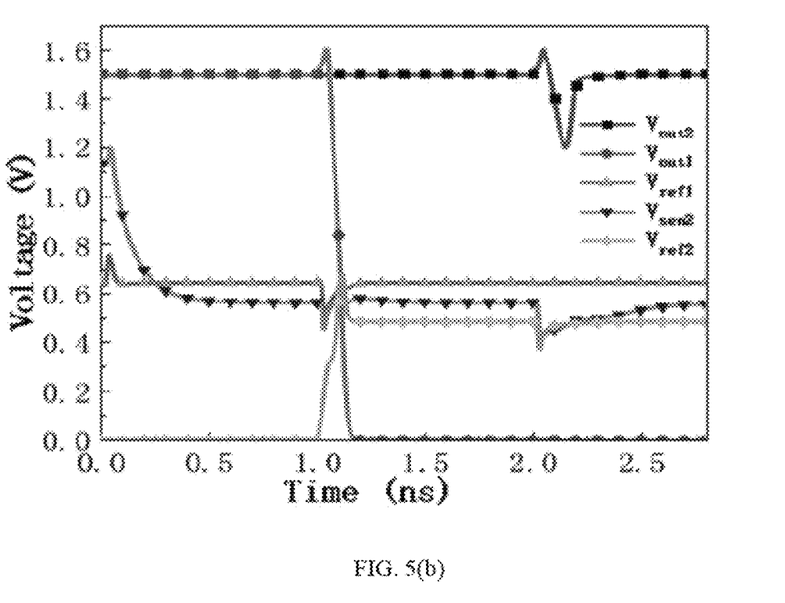
FIG. 5(b) schematically shows a read result of a second resistance state of a multi-resistance-state spintronic device according to embodiments of the present disclosure.
Figure 5C:
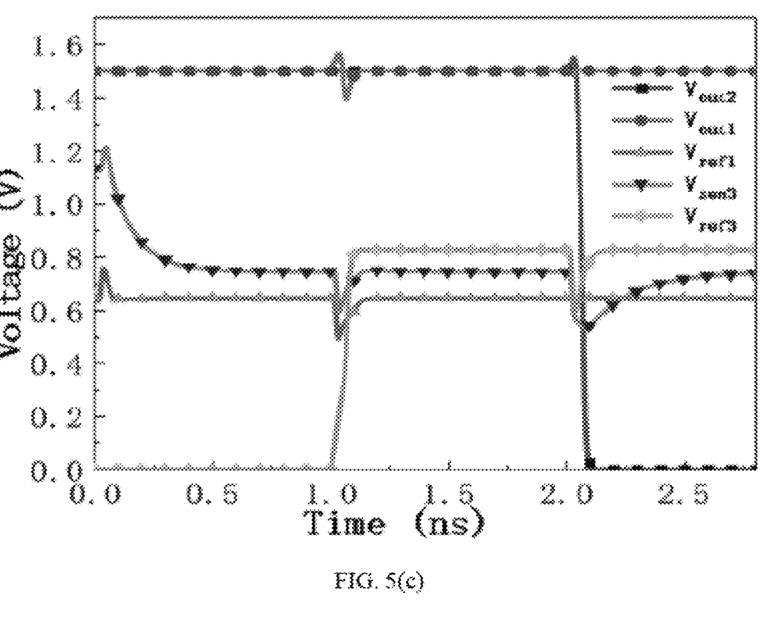
FIG. 5(c) schematically shows a read result of a third resistance state of a multi-resistance-state spintronic device according to embodiments of the present disclosure.
Figure 5D:
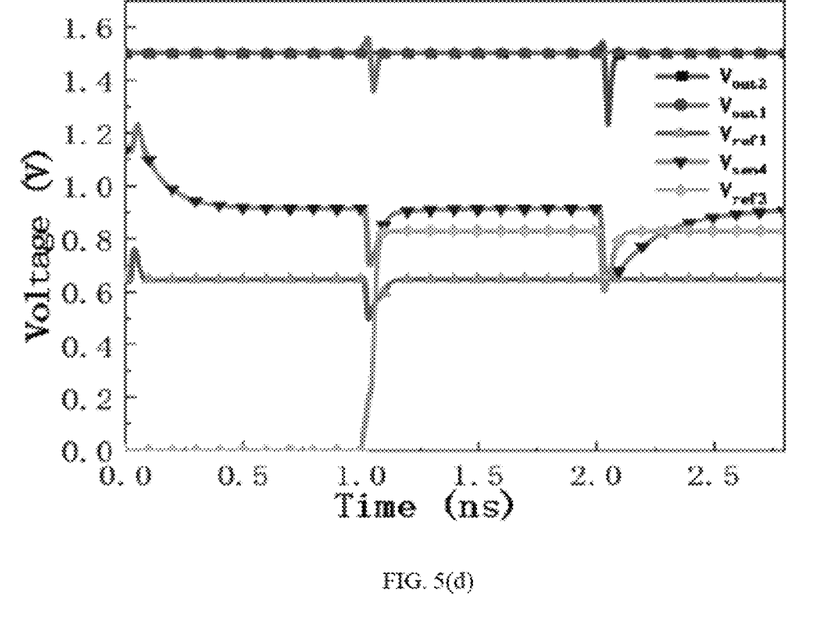
FIG. 5(d) schematically shows a read result of a fourth resistance state of a multi-resistance-state spintronic device according to embodiments of the present disclosure.
Figure 5E:
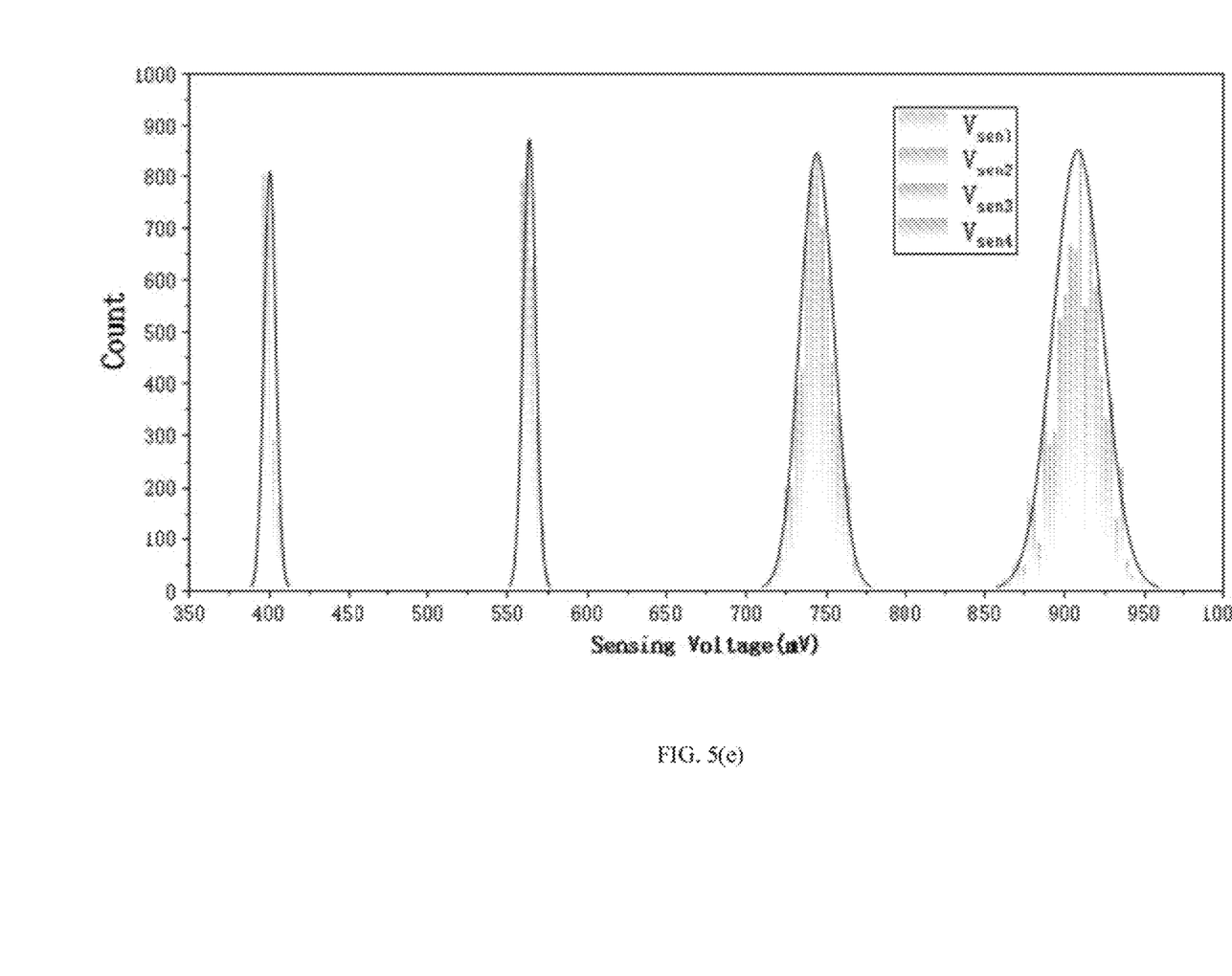
FIG. 5(e) schematically shows a schematic diagram of a distribution result of an induced voltage of a multi-resistance-state spintronic device in a case of 2000-point Monte Carlo simulation according to embodiments of the present disclosure when a process fluctuation is 3σ.

FIG. 5(a) to FIG. 5(d) show schematic diagrams of results corresponding to four resistance states read in FIG. 4, respectively. FIG. 5(a) schematically shows a read result of a first resistance state of a multi-resistance-state spintronic device according to embodiments of the present disclosure; FIG. 5(b) schematically shows a read result of a second resistance state of a multi-resistance-state spintronic device according to embodiments of the present disclosure; FIG. 5(c) schematically shows a read result of a third resistance state of a multi-resistance-state spintronic device according to embodiments of the present disclosure; FIG. 5(d) schematically shows a read result of a fourth resistance state of a multi-resistance-state spintronic device according to embodiments of the present disclosure; FIG. 5(e) schematically shows a schematic diagram of a distribution result of an induced voltage of a multi-resistance-state spintronic device in a case of 2000-point Monte Carlo simulation according to embodiments of the present disclosure when a process fluctuation is 3σ.

The drawings show transient simulation curves of $V_{sen}$ and $V_{ref1}$, $V_{ref2/ref3}$ generated in each resistance state. During a reading process, an interval between $V_{sen}$ and the reference voltage is more than 10%, which has a good read reliability. The read result of the first resistance state 2a is shown in FIG. 5(a) as "$V_{out1}$, $V_{out2}$"="00"; the read result of the second resistance state 2b is shown in FIG. 5(b) as "$V_{out1}$, $V_{out2}$"="01"; the read result of the third resistance state 2c is shown in FIG. (5c) as "$V_{out1}$, $V_{out2}$"="10"; the read result of the fourth resistance state 2d is shown in FIG. 5d) as "$V_{out1}$, $V_{out2}$"="11".

FIG. 5(e) schematically shows a schematic diagram of a distribution result of an induced voltage of the multi-resistance-state spintronic device 402 in the case of 2000-point Monte Carlo simulation according to embodiments of the present disclosure when the process fluctuation is 3σ. Distribution peaks from left to right represent an induced voltage ($V_{sen1}$) of the first resistance state 2a, an induced voltage ($V_{sen2}$) of the second resistance state 2b, an induced voltage ($V_{sen3}$) of the third resistance state 2c, and an induced voltage ($V_{sen4}$) of the fourth resistance state 2d, respectively. It can be seen from the drawings that an induction margin of more than 80 mV is provided between the induced voltages, which may achieve the read reliability.

The present disclosure further provides an in-memory Boolean logic operator, including: the above-mentioned read-write circuit.

According to some embodiments of the present disclosure, the write circuit 401 is used to receive the number of pulses output by a memory array and drive a magnetic domain wall to move, so as to change a resistance state of the multi-resistance-state spintronic device 402.

According to some embodiments of the present disclosure, the read circuit 403 is used to read a resistance state information of the multi-resistance-state spintronic device 402.

According to some embodiments of the present disclosure, the in-memory Boolean logic operator is used to implement a Boolean logical operation through a writing and a reading of the read-write circuit.

Figure 6:
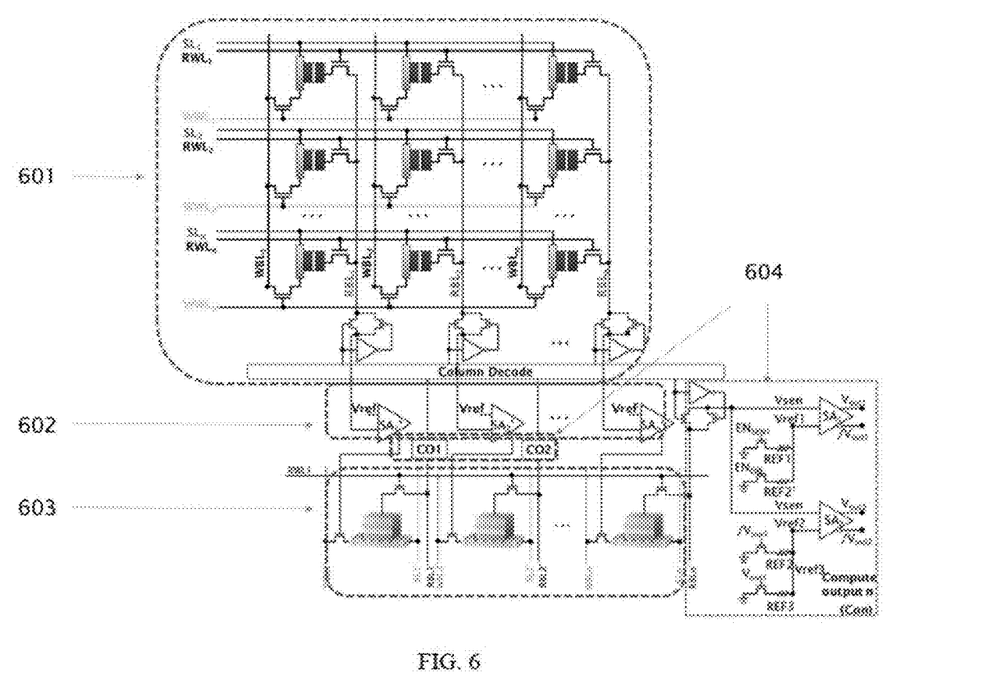
FIG. 6 schematically shows a schematic structural diagram in which a multi-resistance-state spintronic device implements an in-memory computing logical operation according to embodiments of the present disclosure.

FIG. 6 schematically shows a schematic structural diagram in which a multi-resistance-state spintronic device implements an in-memory computing logical operation according to embodiments of the present disclosure.

According to some embodiments of the present disclosure, as shown in FIG. 6, a memory array sense amplifier 602 is used to read a value stored in binary memory arrays of the same column, "1" and "0" are respectively read to generate high voltage and 0 V as a first transistor gate control voltage of the multi-resistance-state spintronic device 402, so as to control a writing of the multi-resistance-state spintronic device 402 in a logical operation array 603.

According to some embodiments of the present disclosure, in a case of a single signal reading and operation, for example, any memory cell of 601 is selected, and a sense amplifier SA' in the same column as 602 may be used to read and perform a "NOT" operation.

According to some embodiments of the present disclosure, in a case of two signal input logical operation arrays, a semi-addition operation and AND/NAND, OR/NOR, XOR/XNOR Boolean logical operations may be achieved. For example, according to a timing sequence, any two memory cells X and Y of the same column in a binary MRAM memory array 601 are selected successively for reading. If the stored data is "1", a corresponding SA' in the same column outputs an applied voltage. While reading an information, a first transistor of a corresponding logical operation cell is turned on. A write pulse is applied to drive the cell to transition from a resistance state to a next resistance state; if the stored data is "0", the corresponding SA' in the same column outputs 0 V, and a state of the corresponding logical operation cell is unchanged. Therefore, when X=0 and Y=0, SA' in the same column of 602 outputs 0 pulses, and the first resistance state 2a of the logical operation cell 603 is kept unchanged, and a logical operation result is read as "00"; when X=0, Y=1, or X=1, Y=0, SA' outputs 1 pulse, a resistance state of the logical operation cell 603 is changed from the first resistance state 2a to the second resistance state 2b, and the logical operation result is read as "01"; when X=1 and Y=1, SA' continuously outputs 2 pulses, a resistance state of the logical operation array 603 is changed from the first resistance state 2a to the second resistance state 2b and then to the third resistance state 2c, and the logical operation result is read as "10". The semi-addition operation between the memory cells X and Y may be achieved by performing the above-mentioned operations.

Figure 7A:
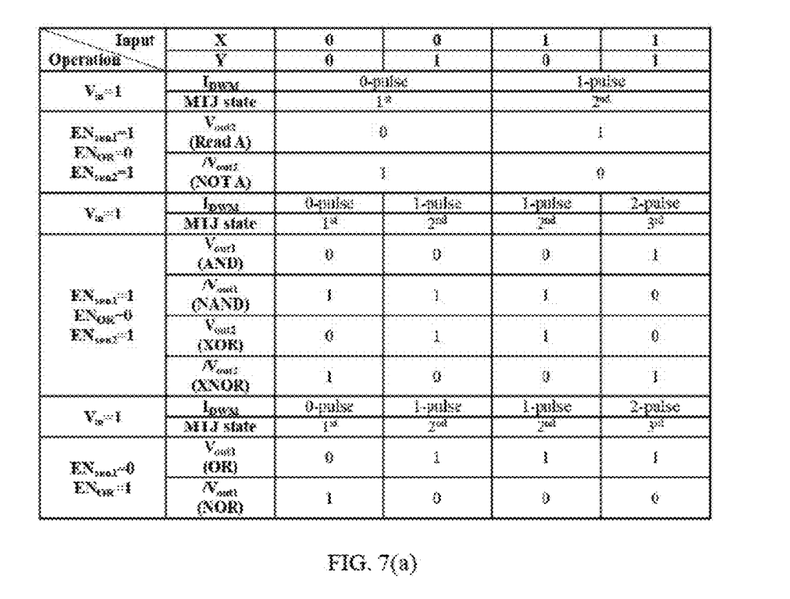
FIG. 7(a) schematically shows a schematic diagram of operations and results of seven different Boolean logical operations for an in-memory Boolean logic operator according to embodiments of the present disclosure.

FIG. 7(a) schematically shows a schematic diagram of operations and results of seven different Boolean logical operations for an in-memory Boolean logic operator according to embodiments of the present disclosure.

According to some embodiments of the present disclosure, logical operation result output portions 604 $V_{out1}$, $\overline{Vout1}$ achieve a reading of AND and NAND operation results of X and Y, respectively, $V_{out2}$, $\overline{Vout2}$ achieve a reading of XOR and XNOR operation results of X and Y. When a OR operation needs to be performed, an enable signal $E_{NOR}$ is applied, and $REF_{2'}$ in 604 generates the reference voltage. An output of OR and NOR operation results of X and Y may be achieved by using $SA_1$ to distinguish between the first resistance state 2a and the second resistance state 2b. The operations and results of the seven different Boolean logical operations are shown in FIG. 7(a).

Figure 7B:
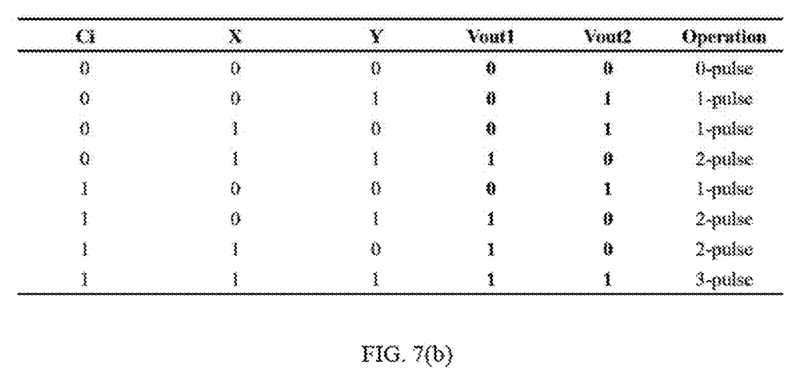
FIG. 7(b) schematically shows a schematic diagram in which an in-memory Boolean logic operator performs a full addition operation on a resistance state switching of a multi-resistance-state spintronic device according to embodiments of the present disclosure.
Figure 7C:
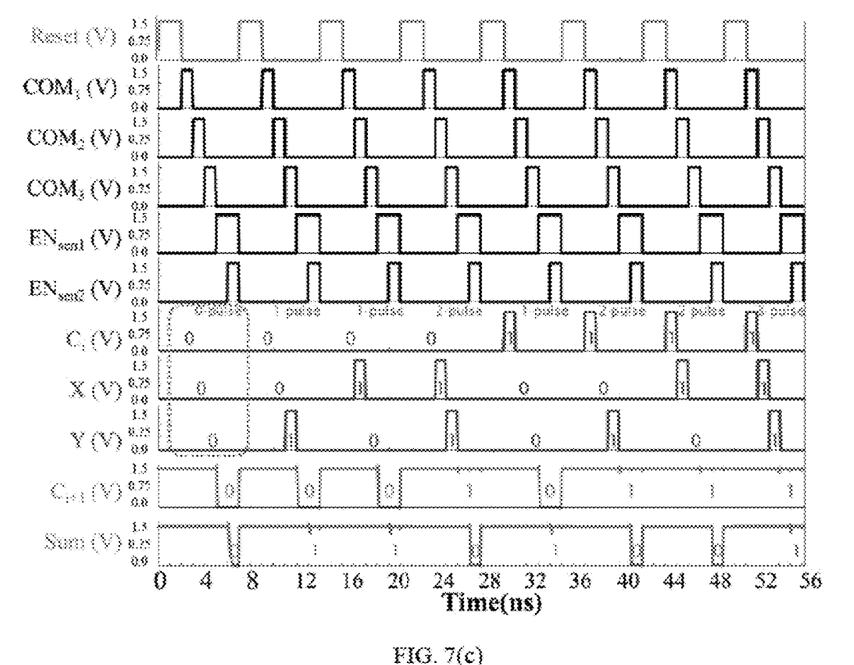
FIG. 7(c) schematically shows a schematic diagram of a timing sequence of an in-memory Boolean logic operator during a full addition operation and an output according to embodiments of the present disclosure.

FIG. 7(b) schematically shows a schematic diagram in which an in-memory Boolean logic operator performs a full addition operation on a resistance state switching of a multi-resistance-state spintronic device according to embodiments of the present disclosure; FIG. 7(c) schematically shows a schematic diagram of a timing sequence of an in-memory Boolean logic operator during a full addition operation and an output according to embodiments of the present disclosure.

According to some embodiments of the present disclosure, in a case of three signal input logical operation arrays, the full addition operation may be achieved. For example, according to the timing sequence, any three memory cells X, Y, Z of the same column in the binary MRAM memory array 601, or an operation carry signal $C_i$ (no connection is shown in figure) output by a previous $SA_1$ and any two memory cells X, Y of the same column may be selected successively. As described in the previous paragraph, the domain wall in the logical operation cell is driven to move, so that a transition of the resistance state. As shown in FIG. 7(b), when X=0, Y=0, $C_i$=0, SA of the same column in the memory array sense amplifier 602 outputs 0 pulses, the first resistance state 2a of the logical operation array 603 is kept unchanged, and the logical operation result is read as "00"; when there is a "1" in the input signal, such as $C_i$=0, X=0, Y=1, SA outputs 1 pulse, and the resistance state of the logical operation cell 603 is changed from the first resistance state 2a to the second resistance state 2b, and the logical operation result is read as "01"; when there are two "1" in the input signal, such as $C_i$=0, X=1, Y=1, SA' continuously outputs 2 pulses, the resistance state of the logical operation array 603 is changed from the first resistance state 2a to the second resistance state 2b and then to the third resistance state 2c, and the logical operation result is read as "10"; when $C_i$=1, X=1, Y=1, and SA' continuously outputs 3 pulses, the resistance state of the logical operation array 603 is changed from the first resistance state 2a to the second resistance state 2b, then to the third resistance state 2c, and finally to the fourth resistance state 2d, the logical operation result is read as "11", so as to achieve an operation and an output of a full addition logic. A timing sequence diagram thereof is shown in FIG. 7c). $C_{i+1}$ is a carry of the operation, Sum is a sum of the operation, and after each operation cycle ends, a reset pulse signal "Reset" is applied.

In the present disclosure, the ferromagnetic free layer 104 may exhibit different resistance states under a full electric field control by providing the plurality of local magnetic domain wall pinning centers 108 on the spin-orbit coupling layer 105 of the magnetic tunnel junction and providing the magnetic domain wall nucleation centers 107 at two ends of the ferromagnetic free layer 104. The bottom electrode 106 and the top electrode 101 are connected to an external read-write circuit, and the read-write circuit controls a change in the resistance state and a reading of the resistance state information of the multi-resistance-state spintronic device 402, so that a writing and a reading of an information may be completed. Compared to the prior art, the technical solution provided by the present disclosure may greatly improve a reading and operation speed, reduce a complexity of the Boolean logical operation, and reduce a power consumption of reading and operation.

The multi-resistance-state spintronic device 402 provided by the present disclosure is capable of effectively driving the domain wall to move and displace without an external field assistance under a full electric field condition. A magnitude and a direction of the displacement may be modulated by the number of pulses, a pulse width and a direction of a current, which may have a high reliability and a circuit compatibility. Compared to a traditional magnetic memory cell that stores two states of "0" and "1", the solution may achieve a multi-valued memory within a single memory cell, such as "00", "01", "10", "11", which may reduce a memory area required to store an information of a same byte. The in-memory Boolean logic operator provided by the present disclosure may implement the in-memory computing logical operation in a non-von Neumann architecture, such as a semi adder, a full adder, AND, NAND, XOR, XNOR, and NOR, OR, which may have a higher operation efficiency.

So far, embodiments of the present disclosure have been described in detail with reference to the accompanying drawings. It should be noted that implementation methods that are not shown or described in the accompanying drawings or the text of the specification are all forms well-known to those skilled in the technical art to which the present disclosure belongs and have not been described in detail. In addition, the above-mentioned definitions of each component are not limited to the various specific structures, shapes, or methods mentioned in the embodiments, and may be simply modified or replaced by those skilled in the art.

It should be noted that in specific embodiments of the present disclosure, unless a contrary intention is indicated, numerical parameters in the specification and the attached claims are approximate values that may be changed according to required characteristics obtained from the content of the present disclosure. Specifically, all numbers used in the specification and the claims to represent dimensions, range conditions, etc. of the composition should be understood as being modified by a term "approximately" or "about" in all cases. In general, the meaning of the above term includes a variation of ±10% in some embodiments, ±5% in some embodiments, ±1% in some embodiments, and ±0.5% in some embodiments, for a specific number.

Those skilled in the art will appreciate that various combinations and/or incorporations of features recited in various embodiments and/or claims of the present disclosure may be made, even if such combinations or incorporations are not explicitly recited in the present disclosure. In particular, without departing from the spirit and principles of the present disclosure, various combinations and/or incorporations of the features recited in the various embodiments and/or claims of the present disclosure may be made. All of the combinations and/or incorporations fall within the scope of the present disclosure.

The above-mentioned specific embodiments have further described the objectives, technical solutions and advantages of the present disclosure in detail. It should be noted that the above are only specific embodiments of the present disclosure and are not intended to limit the present disclosure. Any modifications, equivalent substitutions, improvements, and the like made within the spirit and scope of the present disclosure shall be included in the scope of protection of the present disclosure.

What is claimed is:
1. A multi-resistance-state spintronic device, comprising:
a top electrode configured to be connected to an external read circuit to read a signal;
a bottom electrode configured to be connected to an external write circuit to receive a write signal; and
a magnetic tunnel junction, comprising: a ferromagnetic reference layer below the top electrode;

a ferromagnetic free layer below the ferromagnetic reference layer,
wherein a magnetization direction of the ferromagnetic free layer is antiparallel to a magnetization direction in the ferromagnetic reference layer, and magnetic domain wall nucleation centers are provided at two ends of the ferromagnetic free layer and configured to generate a magnetic domain wall;
a barrier tunneling layer between the ferromagnetic reference layer and the ferromagnetic free layer, wherein the barrier tunneling layer is configured to isolate the ferromagnetic reference layer and the ferromagnetic free layer; and
a spin-orbit coupling layer below the ferromagnetic free layer,
wherein two ends of the spin-orbit coupling layer are respectively connected to two bottom electrodes,
the spin-orbit coupling layer is configured to generate a spin current under an action of the write signal to drive the magnetic domain wall to move,
a plurality of local magnetic domain wall pinning centers are provided at intervals on the spin-orbit coupling layer to enhance a Dzyaloshinskii-Moriya (DM) interaction constant between interfaces,
so as to form a plurality of resistance states.

2. The multi-resistance-state spintronic device according to claim 1, wherein materials of the ferromagnetic reference layer and the ferromagnetic free layer comprise one of: CoFeB, CoFeAl, or Co.

3. The multi-resistance-state spintronic device according to claim 1, wherein a material of the spin-orbit coupling layer comprises one or a combination of: W, Ta, an alloy containing W, or an alloy containing Ta.

4. The multi-resistance-state spintronic device according to claim 1, wherein materials of the local magnetic domain wall pinning centers and the magnetic domain wall nucleation centers comprise Pt.

5. The multi-resistance-state spintronic device according to claim 1, wherein anisotropy energies at two ends of the ferromagnetic free layer are adjustable, and an effective spin-orbit like field torque and a DM interaction intensity at an interface between the ferromagnetic free layer and the spin-orbit coupling layer are adjustable.

6. The multi-resistance-state spintronic device according to claim 1, wherein a number of the local magnetic domain wall pinning centers is N, N pinning regions are generated in the ferromagnetic free layer, and the multi-resistance-state spintronic device comprises N resistance states, where N≥3 and N is an integer.

7. A read-write circuit, comprising:
the multi-resistance-state spintronic device according to claim 1;
a write circuit connected to a bottom electrode of the multi-resistance-state spintronic device, wherein the write circuit is configured to transmit a pulse current to the multi-resistance-state spintronic device to complete a data writing; and
a read circuit connected to a top electrode of the multi-resistance-state spintronic device, wherein the read circuit is configured to receive a reference voltage generated by the multi-resistance-state spintronic device to complete a data reading.

8. The read-write circuit according to claim 7, wherein the bottom electrode of the multi-resistance-state spintronic device comprises a first bottom electrode and a second bottom electrode, the first bottom electrode is connected to a drain electrode of a first transistor, and the top electrode is connected to a drain electrode of a second transistor;
the write circuit is connected to a source electrode of the first transistor, a write signal $V_{in}$ of the write circuit is a gate control signal of the first transistor to control on/off of the first transistor, and the write circuit is configured to transmit the pulse current to the multi-resistance-state spintronic device to complete the data writing; and
the read circuit is connected to a source electrode of the second transistor, a read signal $V_{read}$ of the read circuit is a gate control signal of the second transistor to control on/off of the second transistor, an induced current passes through the multi-resistance-state spintronic device to generate the reference voltage, and the data reading is completed according to the reference voltage.

9. The read-write circuit according to claim 8, wherein the multi-resistance-state spintronic device comprises a first resistance state, a second resistance state, a third resistance state, and a fourth resistance state;
the write circuit is addressed through a row decoding and a column decoding, the first transistor is turned on through a write word line, a write pulse is injected to drive a magnetic domain wall to move, a switching between different resistance states is controlled by controlling a number and a direction of the write pulse, and a displacement direction of the magnetic domain wall is controlled by controlling a polarity direction of the write pulse; and
the read circuit is addressed through a row decoding and a column decoding, the second transistor is turned on through a read word line to generate the reference voltage, and a resistance state information of the multi-resistance-state spintronic device is read through a sense amplifier.

10. An in-memory Boolean logic operator, comprising:
the read-write circuit according to claim 7;
wherein a write circuit is configured to receive pulses output by a memory array and drive a magnetic domain wall to move, so as to change a resistance state of a multi-resistance-state spintronic device;
a read circuit is configured to read a resistance state information of the multi-resistance-state spintronic device; and
the in-memory Boolean logic operator is configured to implement a Boolean logical operation of a write signal and a reading of the write signal through a writing and a reading of the write-read circuit.

* * * * *